United States Patent

Wittwer et al.

[11] Patent Number: 5,303,683
[45] Date of Patent: Apr. 19, 1994

[54] PISTON WITH A PROFILED RING GROOVE

[75] Inventors: Ulrich Wittwer, Deisslingen; Manfred Ziegler, Stuttgart, both of Fed. Rep. of Germany

[73] Assignee: Mahle GmbH, Stuttgart, Fed. Rep. of Germany

[21] Appl. No.: 16,001

[22] Filed: Feb. 10, 1993

[30] Foreign Application Priority Data

Feb. 22, 1992 [DE] Fed. Rep. of Germany ....... 4205503

[51] Int. Cl.$^5$ .............................. F02F 3/00; F02F 5/00
[52] U.S. Cl. .................................. 123/193.6; 92/193; 277/216
[58] Field of Search ............ 123/193.6, 193.1; 92/193, 200, 223; 277/138, 216, 217

[56] References Cited

U.S. PATENT DOCUMENTS 4,422,649 12/1983 Howarth .......................... 277/216
4,899,702 2/1990 Sasaki et al. ..................... 123/193.6
5,001,965 3/1991 Ruddy et al. ......................... 92/193
5,083,536 1/1992 Ariga .................................. 123/193.6
5,085,185 2/1992 Heshmat ........................... 123/193.6

Primary Examiner—Tony M. Argenbright
Assistant Examiner—M. Macy
Attorney, Agent, or Firm—Collard & Roe

[57] ABSTRACT

A piston with at least one compression ring, a top end and a longitudinally extending axis for an internal combustion engine. The piston includes at least one compression ring groove defined by first and second spaced lateral surfaces for receiving the at least one compression ring. The first lateral surface is located nearest the top end of the piston. At least one of the first and second surfaces includes a plurality of profiles extending circularly around the axis and having a depth in the range of 0.003 mm to 0.015 mm and a width in the range of 0.02 mm to 0.2 mm.

20 Claims, 2 Drawing Sheets

PISTON WITH A PROFILED RING GROOVE

BACKGROUND OF THE INVENTION

1. Field of the Invention

The invention relates to a piston for an internal combustion engine with a profiled ring groove.

More particularly, this invention relates to a piston where at least one surface of a compression ring groove is provided with profiling extending circularly around the longitudinal piston axis.

2. Description of the Prior Art

Internal combustion engines, and specifically Otto-cycle engines are known which have pistons made of light metal alloys. During the initial break-in period of these engines, the groove surfaces can be damaged, particularly in the upper most compression ring groove. In order to prevent excessive wear, these grooves have been surface-coated, which is a costly process.

German patent DE-OS 39 03 722 discloses a piston for an internal combustion engine in which the ring groove is treated in order to prevent the piston ring from sticking to the aluminum alloy of the piston without increasing the amount of gasoline blow-by or oil consumption. At least one of the lower groove surfaces of the uppermost compression ring grooves is subjected to a surface-hardening treatment (anodizing treatment) so that the roughness of the surface is increased. The surface of the piston ring, disposed opposite the hardened surface, is provided with a resin coating which provides excellent adhesive properties. One disadvantage of this method is that the anodizing treatment produces a non-uniform rough surface on the lower groove side, and the piston rings require an additional coating.

U.S. Pat. No. 5,083,536 discloses large radial recesses distributed over the circumference of the top surface of the upper compression groove. The combustion gases can exert an intense force on the uppermost piston ring to press it against the lower groove surface.

However, the prior art does not disclose a simple way to prevent damage to the groove surfaces.

SUMMARY OF THE INVENTION

It is, therefore, an object of the present invention to provide a piston in which damage to the groove surfaces is avoided.

It is a further object of the present invention to provide a piston in which the groove surfaces are simply constructed to avoid damage even under high-load operating conditions.

These and other related objects are achieved according to the invention by a piston with at least one compression ring, a top end and a longitudinally extending axis for an internal combustion engine. The piston includes at least one compression ring groove defined by first and second spaced lateral surfaces for receiving the at least one compression ring. The first lateral surface is located nearest the top end of the piston. At least one of the first and second surfaces includes a plurality of profiles extending circularly around the axis having a depth in the range of 0.003 mm to 0.015 mm, and a width in the range of 0.02 mm to 0.2 mm.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF THE PREFERRED EMBODIMENTS

Figure 1:
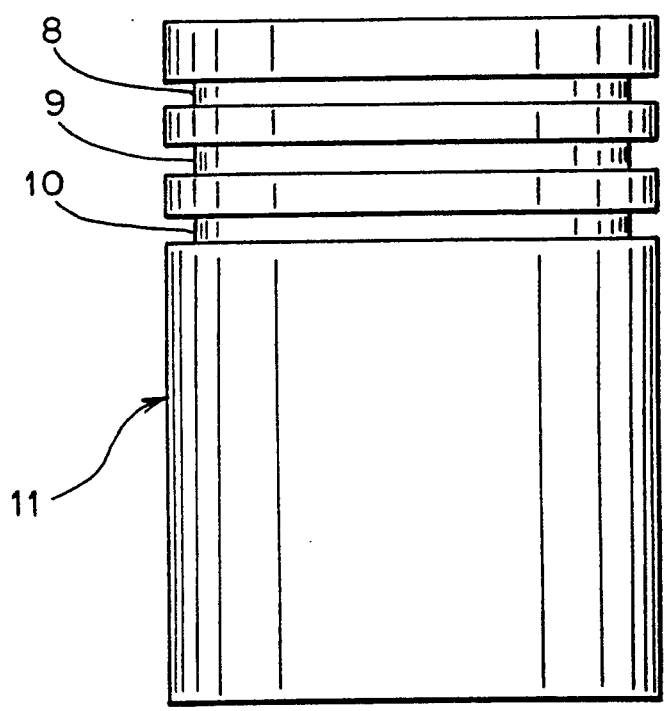
FIG. 1 is a side elevational view of a piston with ring grooves according to the invention.

Referring now in detail to the drawings, and in particular FIG. 1, there is shown a piston 11 for an Otto-internal combustion engine, preferably made of an aluminum alloy. Piston 11 includes an uppermost ring groove 8, a middle ring groove 9 and a lowermost ring groove 10. Ring grooves 8 and 9 are compression ring grooves and lowermost ring groove 10 is an oilstripping ring groove.

Figure 2:
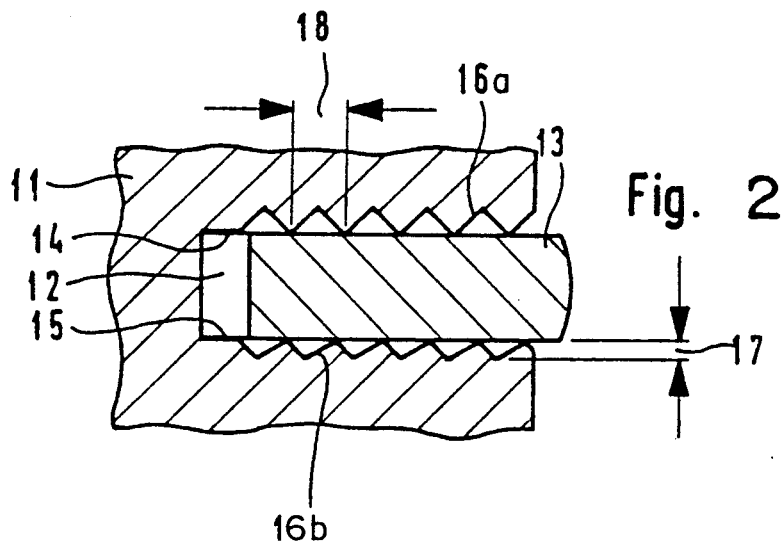
FIG. 2 is an enlarged cross-sectional view of a ring groove with profiling.

FIG. 2 shows a profiled ring groove 12 having an upper groove surface (or side) 14 and a lower groove surface (or side) 15. Upper groove surface 14 and lower groove surface 15 define spaced lateral surfaces (or sides). Profiled groove 12 is a compression ring groove, corresponding to uppermost ring groove 8 or middle ring groove 9 from FIG. 1, and is configured and dimensioned to receive a compression ring 13. Upper groove surface 14 is provided with profiles 16a which are triangularwave shaped. The lower groove surface 15 is provided with profiles 16b which are shaped like a saw-tooth wave. Although both groove surfaces 14 and 15 are shown with profiling, profiling may be provided on at least one of the groove surfaces, on at least one of the compression ring grooves 8, 9.

Figure 3:
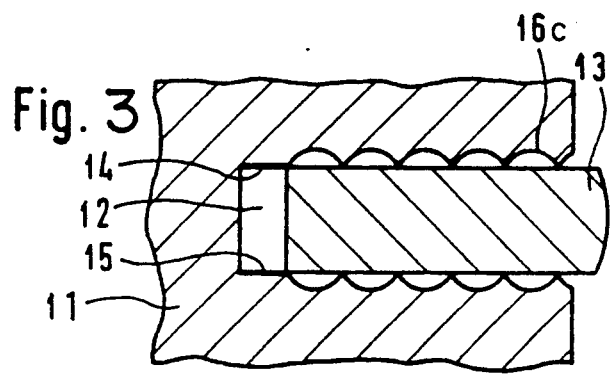
FIG. 3 is an enlarged cross-sectional view of a ring groove with alternate profiling.
Figure 4:
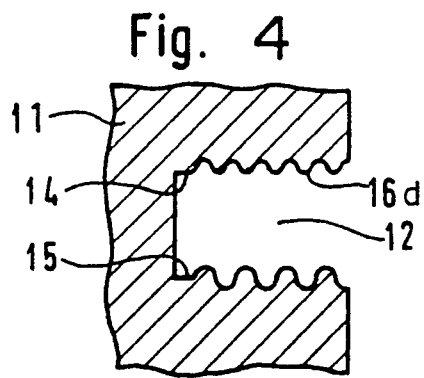
FIG. 4 is an enlarged cross-sectional view of a ring groove showing a further embodiment.
Figure 5:
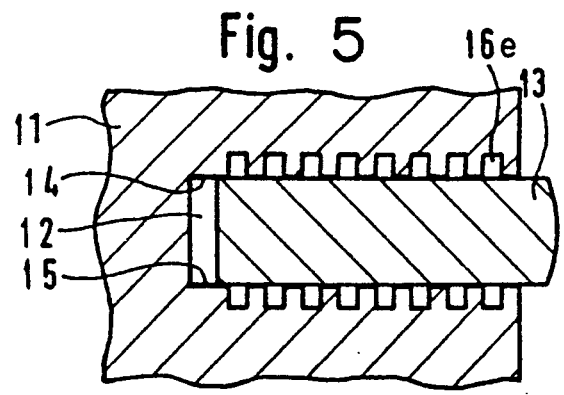
FIG. 5 is an enlarged cross-sectional view of a ring groove showing yet another embodiment.

FIG. 3 shows a ring groove having profiles 16c which are arch-shaped. FIG. 4 shows profiling 16d which is sine-wave shaped profiling or an undulating profile. FIG. 5 shows profiling 16e which is square-wave shaped or meander-shaped. In a preferred embodiment of the invention, the profiling is located on at least lower surface 15 of the uppermost ring groove.

As can be seen in FIG. 2, a depth 17 is shown which measures the distance between the highest elevation or peak and the deepest trough or valley. The depth of profiles 16 is, for example, between 0.003 mm and 0.015 mm, preferably between 0.004 mm to 0.007 mm. In a preferred embodiment, the depth is 0.004 mm. A width 18 of profiles 16 is also shown in FIG. 2 which denotes the distance from one peak to the next, similar to a measure of wavelength. The width 18 of profiles 16 is between 0.02 mm and 0.2 mm, preferably 0.1 mm.

Profiles 16 can be spirally configured such that each surface consists of a single trough starting at the periphery of the piston and gradually spiralling in towards the center, similar to the groove on a musical record. This type of a spiral or "record" profiling can be manufactured by pre-cutting an outline of the profiling with a plane-parallel knife and subsequently finishing the piston by turning it with a suitable shaping tool.

Alternatively, the profiles may consist of a series of concentric peaks and troughs along the groove surfaces.

Surprisingly, it was found that with the profiling according to the invention, the groove surfaces remained undamaged during the break-in period of a high-output Otto engine. A piston provided with profiling according to the invention can be simply manufactured to prevent damage to the groove surfaces even under high-load operating conditions.

While several embodiments of the present invention have been shown and described, it is to be understood that many changes and modifications may be made thereunto without departing from the spirit and scope of the invention as defined in the appended claims.

What is claimed is:

1. A piston for an internal combustion engine having a top end, a longitudinally extending axis, and at least one compression ring groove defined by first and second spaced lateral surfaces for receiving at least one compression ring, said first lateral surface being located nearest the top end of the piston, comprising:

a plurality of profiles cut into at least one of said first and second surfaces extending circularly around the axis, said plurality of profiles having a depth in the range of 0.003 mm to 0.015 mm and a width in the range of 0.02 mm to 0.2 mm.

2. A piston according to claim 1, wherein said plurality of profiles is cut into at least said second surface of one of said at least one compression ring grooves located nearest the top end of the piston.

3. A piston according to claim 2, wherein said plurality of profiles has a depth in the range of 0.004 mm to 0.007 mm.

4. A piston according to claim 3, wherein said plurality of profiles has a saw tooth-shaped radial cross section.

5. A piston according to claim 4, wherein said plurality of profiles is concentric with the longitudinal piston axis.

6. A piston according to claim 4, wherein said plurality of profiles forms a spiral with respect to the longitudinal piston axis.

7. A piston according to claim 3, wherein said plurality of profiles has an arch-shaped radial cross section.

8. A piston according to claim 7, wherein said plurality of profiles is concentric with the longitudinal piston axis.

9. A piston according to claim 7, wherein said plurality of profiles forms a spiral with respect to the longitudinal piston axis.

10. A piston according to claim 3, wherein said plurality of profiles has a triangular wave-shaped radial cross section.

11. A piston according to claim 10, wherein said plurality of profiles is concentric with the longitudinal piston axis.

12. A piston according to claim 10, wherein said plurality of profiles forms a spiral with respect to the longitudinal piston axis.

13. A piston according to claim 3, wherein said plurality of profiles has a sine wave-shaped radial cross section.

14. A piston according to claim 13, wherein said plurality of profiles is concentric with the longitudinal piston axis.

15. A piston according to claim 13, wherein said plurality of profiles forms a spiral with respect to the longitudinal piston axis.

16. A piston according to claim 3, wherein said plurality of profiles has a square wave-shaped radial cross section.

17. A piston according to claim 16, wherein said plurality of profiles is concentric with the longitudinal piston axis.

18. A piston according to claim 16, wherein said plurality of profiles forms a spiral with respect to the longitudinal piston axis.

19. A piston according to claim 3, wherein said plurality of profiles has an undulating wave-shaped radial cross section.

20. A piston according to claim 3, wherein said plurality of profiles has a wavelike radial cross section.

* * * * *